(12) United States Patent
Wohlgemuth et al.

(10) Patent No.: US 9,677,153 B2
(45) Date of Patent: Jun. 13, 2017

(54) METHOD FOR THE HYDROMETALLURGICAL RECOVERY OF LITHIUM FROM THE FRACTION OF USED GALVANIC CELLS CONTAINING LITHIUM, IRON AND PHOSPHATE

(71) Applicant: Rockwood Lithium GmbH, Franfurt am Main (DE)

(72) Inventors: David Wohlgemuth, Frankfurt (DE); Mark Andre Schneider, Friedrichsdorf-Burgholzhausen (DE); Rebecca Spielau, Eppstein (DE); Johannes Willems, Frankfurt (DE); Martin Steinbild, Frankfurt (DE)

(73) Assignee: Rockwood Lithium GmbH (DE)

( * ) Notice: Subject to any disclaimer, the term of this patent is extended or adjusted under 35 U.S.C. 154(b) by 41 days.

(21) Appl. No.: 14/433,096

(22) PCT Filed: Oct. 9, 2013

(86) PCT No.: PCT/EP2013/003027
§ 371 (c)(1),
(2) Date: Apr. 9, 2015

(87) PCT Pub. No.: WO2014/056608
PCT Pub. Date: Apr. 17, 2014

(65) Prior Publication Data
US 2015/0267277 A1    Sep. 24, 2015

(30) Foreign Application Priority Data

Oct. 10, 2012   (DE) .................. 10 2012 218 461
Oct. 10, 2012   (DE) .................. 10 2012 218 462

(51) Int. Cl.
*C22B 26/00*   (2006.01)
*C22B 26/12*   (2006.01)
*C22B 7/00*    (2006.01)
*B01D 61/44*   (2006.01)
*B01D 61/58*   (2006.01)
*C01B 25/45*   (2006.01)
*C01D 15/02*   (2006.01)

(52) U.S. Cl.
CPC ............ *C22B 26/12* (2013.01); *B01D 61/445* (2013.01); *B01D 61/58* (2013.01); *C01B 25/45* (2013.01); *C01D 15/02* (2013.01); *C22B 7/007* (2013.01); *Y02P 10/234* (2015.11)

(58) Field of Classification Search
CPC ......... C22B 26/12; C22B 7/007; C01B 25/45; C01D 15/02; B01D 61/58; B01D 61/445
USPC .............................. 423/179.5, 306; 204/537
See application file for complete search history.

(56) References Cited

U.S. PATENT DOCUMENTS

| 6,261,712 B1 * | 7/2001 | Hayashi ............... H01M 10/54 423/179.5 |
| 2013/0192425 A1 * | 8/2013 | Sonu ...................... C22B 3/0068 75/743 |
| 2013/0206607 A1 * | 8/2013 | Kojima ................... C22B 7/007 205/589 |

FOREIGN PATENT DOCUMENTS

| CN | 1166699 A | 12/1997 |
| CN | 1948135 A | 4/2007 |
| CN | 102036739 A | 4/2011 |
| JP | 2012-234732 A | 11/2012 |
| WO | 2010056322 A1 | 5/2010 |
| WO | 2012/072619 A1 | 6/2012 |

* cited by examiner

*Primary Examiner* — Steven Bos
(74) *Attorney, Agent, or Firm* — Jeremy J. Kliebert

(57) ABSTRACT

A method for the hydrometallurgical recovery of lithium from the fraction of used galvanic cells containing lithium, iron and phosphate is disclosed. According to the method, lithium-iron-phosphate-containing fraction is introduced into sulfuric acid and/or hydrochloric acid, and hydrogen peroxide is added in an amount that is at least stoichiometric relative to the iron content to be oxidized of the lithium-iron-phosphate-containing fraction.

21 Claims, No Drawings

METHOD FOR THE HYDROMETALLURGICAL RECOVERY OF LITHIUM FROM THE FRACTION OF USED GALVANIC CELLS CONTAINING LITHIUM, IRON AND PHOSPHATE

This application is a §371 of International Application No. PCT/EP2013/003027 filed Oct. 9, 2013, and claims priority from German Patent Application No. 10 2012 218 461.9 filed Oct. 10, 2012 and German Patent Application No. 10 2012 218 462.7 filed Oct. 10, 2012, each of which is incorporated by reference herein in its entirety for all purposes.

The subject matter of the invention is a method for the hydrometallurgical recovery of lithium from the fraction of used galvanic cells containing lithium, Iron and phosphate.

Mobile electronic devices require increasingly powerful rechargeable batteries for self-sufficient power supply. For this purpose on account of the energy density thereof expressed in Wh/kg, cycling stability and low self-discharge, lithium-ion batteries are employed. With respect to safety, lithium-iron-phosphate batteries ($LiFePO_4$) also known as LFP batteries, have proved to be advantageous. The active cathode materials in these batteries consist of lithium-iron-phosphate, from which lithium ions are released during charging and intercalated in the anode material. High capacity lithium accumulators are used for stationary applications (power back-up) or in the automobile field for traction purposes (hybrid drive or pure electric drive). With respect to safety in the latter applications, LFP batteries are recognized as being of outstanding importance. Since the amount of recyclable material contained therein grows with the size and number of the manufactured, charged and reused batteries, an economical method for recovery of the lithium within the batteries is indispensable.

A method for recovery of lithium from the $LiFePO_4$-containing fraction of shredded and sifted cells is known from the document WO 2012/072619 A1, in which the fraction containing $LiFePO_4$ is treated with acid solution in the presence of an oxidizing agent. The dissolved-out lithium ions are separated from undissolved iron phosphate and precipitate out as salts from the solution containing lithium. The hydrometallurgical reclamation takes place with sulphuric acid accompanied by introduction of oxygen, ozone or addition of hydrogen peroxide in the temperature range of 80° C. to 120° C.

Disadvantages of this method are the high energy intensity of the extraction process, the high requirements with respect to corrosion resistance of the apparatus used and the purity of the lithium salt obtained by precipitation.

The object of the invention is to provide a method, which ensures the highest possible energy efficiency in the extraction of lithium and at the same time low requirements with respect to corrosion resistance of the apparatus used and increased purity of the lithium compounds obtained.

The given object is achieved by a method for the hydrometallurgical recovery of lithium from the lithium-iron-phosphate-containing fraction of used galvanic cells, in which a lithium-iron-phosphate-containing fraction having an aluminum content of up to 5% by weight, and having a particle size of up to 150 µm, is introduced into sulfuric acid having a concentration of 0.5 to 3 mol/l in an amount that is at least stoichiometric relative to the lithium content of the lithium-iron-phosphate-containing fraction and in a solid-to-liquid ratio in the range of 100 to 750 g/l, and is solubilized at temperatures of between 25-70° C. by adding hydrogen peroxide in an amount that is at least stoichiometric relative to the iron content to be oxidized of the lithium-iron-phosphate-containing fraction, the formed lithium sulphate solution is separated off and the remaining residue is washed at least twice, the separated lithium sulphate solution and the wash solutions containing the lithium sulphate are combined and are converted to lithium hydroxide by means of electrodialysis with bipolar membranes.

Alternatively, the object is achieved by a method for the hydrometallurgical recovery of lithium from the lithium-iron-phosphate-containing fraction of used galvanic cells, in which a lithium-iron-phosphate-containing fraction having an aluminum content of up to 5% by weight, and having a particle size of up to 500 µm, is introduced into hydrochloric acid having a concentration of 0.5 to 3 mol/l in an amount that is at least stoichiometric relative to the lithium content of the lithium-iron-phosphate-containing fraction and in a solid-to-liquid ratio in the range of 50 to 450 g/l, and is solubilized at temperatures of between 30-70° C. by adding hydrogen peroxide in an amount that is at least stoichiometric relative to the iron content to be oxidized of the lithium-iron-phosphate-containing fraction, the formed lithium chloride solution is separated off and the remaining residue is washed at least twice, the separated lithium chloride solution and the wash solutions containing the lithium chloride are combined and are converted to lithium hydroxide by means of electrodialysis with bipolar membranes.

Surprisingly, it has been found, that the aluminum content should be under the recommended threshold value, in order to avoid the generation of an inflammable, explosive gas mixture and problems during separation of the dissolved aluminum. Surprisingly, the separation of the aluminum used as a current conductor succeeds by means of physical separation methods, if the fraction containing lithium-iron-phosphate was shredded to the specified particle size. Furthermore, it was found that the extraction of lithium without an additional heat source already takes place through utilization of the reaction heat released during the extraction. Thereby, a virtually-autocatalytic decomposition of the oxidizing agent can be generally avoided, since the heat of reaction is controlled and kept very low. For the extraction of lithium effectively, only stoichiometric amounts of oxidizing agent must be used.

Therefore, the contained lithium is solubilized to more than 99 wt. % under the specified mild, hydrometallurgical digestion conditions and recovered at more than 90 wt. % in the case of use of sulphuric acid or at more than 95 wt. % if hydrochloric acid is used.

A lithium-iron-phosphate-containing fraction having an aluminum content of up to 3 wt. %, preferably <1 wt. % is used. Thereby, the generation of a flammable, explosive gas mixture and problems in the separation of the dissolved aluminum are further decreased.

Preferably, the content of multivalent metal cations is further reduced by means of ion exchange. The lowered content of multivalent metal cations has a particularly positive effect on further processing of the solution by means of electrodialysis with bipolar membranes, since these metal cations act as "membrane poisons" due to deposition thereof in the hydroxide form in and on the membranes used.

More preferably, the lithium-iron-phosphate-containing fraction has a particle size up to 500 µm, preferably 50 to 400 µm. The use of the mentioned particle size improves the digestion behavior and facilitates the separation of aluminum.

Advantageously, the sulphuric acid is added at a concentration of 0.75 to 2.5 mol/l, preferably 1.0 to 2.0 mol/l. The use of sulphuric acid in the stated concentration range significantly lowers the demands upon the corrosion resistance of the apparatus used.

More preferably, the solid-to-liquid ratio is adjusted in a range of 150 to 650 g/l, preferably 250 to 550 g/l μm in the case of the use of sulphuric acid, or in the case of hydrochloric acid to a solid-to-liquid ratio in a range of 80 to 400 g/l, preferably 150 to 300 g/l. Despite the high solid content in the reaction mixture, the contained lithium is solubilized nearly quantitatively.

Preferably, the digestion is carried out at temperatures of 30 to 65° C., preferably at 35 to 60° C. in the case of the use of sulphuric acid, or in the case of use of hydrochloric acid, the digestion is carried out at temperatures of 35 to 65° C., preferably at 40 to 60° C. Surprisingly, the effectiveness of dissolving out the lithium is thereby not substantially influenced by the run time or the amount. The mentioned temperature range is adjustable with ordinary technical equipment.

Advantageously, the digestion residue is washed at least three times. It was found, that thereby more than 90 wt. % of the contained lithium can be obtained in the case of the use of sulphuric acid, or in the case of the use of hydrochloric acid, more than 95 wt. % can be obtained.

Preferably the sulphuric acid and/or the hydrogen peroxide is employed in excess. More preferably, an excess of 0.1 to 10 mol %, preferably 1 to 5% mol % is used in the case of the use of sulphuric acid, or in the case of the use of hydrochloric acid, an excess of 0.1 to 10 mol %, preferably 0.5 to 5 mol %, is used.

The product made according to the method is suitable with respect to the purity thereof for production of lithium transition metal oxides or lithium transition metal phosphates and may preferably be used for producing active materials for use in cathodes of lithium-ion batteries.

The process according to the invention is generally described hereinafter.

EXAMPLES

The invention is explained in the case of the use of sulphuric acid with the aid of the following examples and Table 1.

Under the conditions specified in Table 1, in each case 5 experiments were carried out with two different lithium-iron-phosphate-containing fractions.

A lithium-iron-phosphate-containing fraction was used in Experiments 1-5, which was obtained from cathodes not installed in batteries. For experiments 6 to 10 a lithium-iron-phosphate-containing fraction from batteries was used. Hydrogen peroxide in excess of 5 mol % was used as oxidizing agent.

TABLE 1

| Test number | S/L [g/l] | $c(H_2SO_4)$ excess | Process conditions | Li [%] | Fe [%] | P [%] |
|---|---|---|---|---|---|---|
| 1 | 488 | 2M 5 mol % | 6 h, 60° C. | 91.6 | 1.3 | 0.6 |
| 2 | 270 | 1M 5 mol % | 6 h, 60° C. | 95.8 | 0.3 | 1.1 |
| 3 | 270 | 1M 5 mol % | 5 h, 55° C. | 97.8 | 0.2 | 0.8 |
| 4 | 488 | 2M 5 mol % | 5 h, 55° C. | 91.6 | 1.8 | 0.7 |
| 5 | 270 | 1M 5 mol % | 5 h, 60° C. | >99 | 6.0 | 7.6 |
| 6 | 270 | 1M 5 mol % | 5 h, 60° C. | >99 | 5.5 | 6.7 |
| 7 | 270 | 1M 5 mol % | 5 h, 60° C. | >99 | 4.0 | 5.5 |
| 8 | 270 | 1M 5 mol % | 7 h, 60° C. | >99 | 4.0 | 6.6 |
| 9 | 270 | 1M 5 mol % | 5 h, 60° C. | >99 | 6.4 | 7.5 |
| 10 | 488 | 2M 5 mol % | 5 h, 55° C. | >99 | 12.5 | 13.4 |

The invention is explained in the case of the use of hydrochloric acid by means of the following examples and Table 2.

Under the conditions specified in Table 2, in each case 8 tests with two different lithium-iron-phosphate-containing fractions were carried out. Tests 11 to 14 were executed with a lithium-iron-phosphate-containing fraction, which was obtained from cathodes not installed in batteries. For tests 15 to 18, a fraction containing lithium-iron-phosphate from batteries was used.

Hydrogen peroxide was used as oxidizing agent at the specified excess.

TABLE 1

| Test number | S/L [g/l] | c(HCL) excess | $c(H_2SO_4)$ excess | Process conditions | Li [%] | Fe [%] | P [%] |
|---|---|---|---|---|---|---|---|
| 11 | 300 | 2M 5 mol % | without $H_2O_2$ | 5 h, 40° C. | 36.0 | 26.6 | 26.2 |
| 12 | 300 | 2M 5 mol % | without $H_2O_2$ | 5 h, 40° C. | 37.5 | 27.9 | 24.4 |
| 13 | 270 | 2M 5 mol % | 30 wt. % 20 mol % | 24 h, 25° C. | 53.4 | 2.1 | 0.1 |
| 14 | 270 | 2M 5 mol % | 30 wt. % 20 mol % | 1 h, 40° C. | 100 | 0.5 | 0.3 |
| 15 | 270 | 2M 5 mol % | 30 wt. % 20 mol % | 5 h, 40° C. | 100 | 0.9 | 0.4 |
| 16 | 270 | 2M 5 mol % | 30 wt. % 20 mol % | 5 h, 40° C. | 88.8 | 31.5 | 29.0 |
| 17 | 270 | 2M 5 mol % | 30 wt. % 20 mol % | 5 h, 40° C. | 100 | 18.4 | 17.4 |
| 18 | 270 | 2M 5 mol % | 30 wt. % 20 mol % | 5 h, 40° C. | 84.0 | 11.8 | 11.0 |

The invention claimed is:

1. A method for the hydrometallurgical recovery of lithium from a lithium-iron-phosphate-containing fraction of used galvanic cells comprising the steps of:
    introducing the lithium-iron-phosphate-containing fraction having an aluminum content of up to 5% by weight, and having a particle size of up to 500 μm, into sulfuric acid having a concentration of 0.5 to 3 mol/l in an amount that is at least stoichiometric relative to the lithium content of the lithium-iron-phosphate-containing fraction and in a solid-to-liquid ratio in the range of 100 to 750 g/l; and
    solubilizing the lithium contained in the lithium-iron-phosphate-containing fraction at temperatures of between 25-70° C. with addition of hydrogen peroxide in an amount that is at least stoichiometric relative to the iron content of the lithium-iron-phosphate-containing fraction, wherein a lithium sulfate solution is formed;
    separating the lithium sulfate solution from a remaining residue; and washing the remaining residue at least twice, wherein a wash solution containing lithium sulfate is formed;

wherein the separated lithium sulfate solution and the wash solution containing lithium sulfate are combined and are converted to lithium hydroxide by means of electrodialysis with bipolar membranes.

2. A method for the hydrometallurgical recovery of lithium from a lithium-iron-phosphate-containing fraction of used galvanic cells, comprising:

introducing the lithium-iron-phosphate-containing fraction having an aluminum content of up to 5% by weight, and having a particle size of up to 500 μm, into hydrochloric acid having a concentration of 0.5 to 3 mol/l in an amount that is at least stoichiometric relative to the lithium content of the lithium-iron-phosphate-containing fraction and in a solid-to-liquid ratio in the range of 50 to 450 g/l; and solubilizing the lithium contained in the lithium-iron-phosphate-containing fraction at temperatures of between 30-70° C. with addition of hydrogen peroxide in an amount that is at least stoichiometric relative to the iron content of the lithium-iron-phosphate-containing fraction, wherein a lithium chloride solution is formed;

separating the lithium chloride solution from a remaining residue; and washing the remaining residue at least twice, wherein a wash solution containing lithium chloride is formed;

wherein the separated lithium chloride solution and the wash solution containing lithium chloride are combined and are converted to lithium hydroxide by means of electrodialysis with bipolar membranes.

3. The method according to claim 1, wherein the aluminum content of the lithium-iron-phosphate-containing fraction is up to 3 wt. %.

4. The method according to claim 2, wherein the aluminum content of the lithium-iron-phosphate-containing fraction is up to 3 wt. %.

5. The method according to claim 1, wherein a content of multivalent metal cations is reduced by means of an ion exchanger.

6. The method according to claim 3, wherein a content of multivalent metal cations is reduced by means of an ion exchanger.

7. The method according to claim 4, wherein a content of multivalent metal cations is reduced by means of an ion exchanger.

8. The method according to claim 1, wherein the lithium-iron-phosphate-containing fraction has a particle size of up to 150 μm.

9. The method according to claim 2, wherein the lithium-iron-phosphate-containing fraction has a particle size of up to 50 to 400 μm.

10. The method according to claim 1, wherein the sulfuric acid is used in a concentration of 0.75 to 2.5 mol/l.

11. The method according to claim 2, wherein the hydrochloric acid is used in a concentration of 0.75 to 2.5 mol/l.

12. The method according to claim 1, wherein the solid-to-liquid ratio is adjusted in the range of 150 to 650 g/l.

13. The method according to claim 2, wherein the solid-to-liquid ratio is adjusted in the range of 80 to 400 g/l.

14. The method according to claim 1, wherein the solubilizing step is carried out at temperatures of from 30 to 65° C.

15. The method according to claim 2, wherein the solubilizing step is carried out at temperatures of from 35 to 65° C.

16. The method according to claim 1, wherein the remaining residue is washed at least three times.

17. The method according to claim 2, wherein the remaining residue is washed at least three times.

18. The method according to claim 1, wherein the sulfuric acid and/or the hydrogen peroxide are/is used in excess.

19. The method according to claim 1, wherein the hydrochloric acid and/or the hydrogen peroxide are/is used in excess.

20. The method according to claim 18, wherein an excess of 0.1 to 10 mol % of the hydrochloric acid and/or the hydrogen peroxide is used.

21. The method according to claim 19, wherein an excess of 0.1 to 10 mol % of the hydrochloric acid and/or the hydrogen peroxide is used.

* * * * *